United States Patent [19]

Kohno et al.

[11] Patent Number: 4,609,270
[45] Date of Patent: Sep. 2, 1986

[54] CAMERA WITH INTERCHANGEABLE TAKING LENSES

[75] Inventors: Atsuo Kohno; Minoru Shiiba; Eishiroh Kikuchi, all of Tokyo, Japan

[73] Assignee: Fuji Photo Film Co., Ltd., Kanagawa, Japan

[21] Appl. No.: 741,295

[22] Filed: Jun. 4, 1985

[30] Foreign Application Priority Data

Jun. 4, 1984 [JP] Japan ............................ 59-81875[U]

[51] Int. Cl.[4] .......................... G03B 3/00; G03B 17/02
[52] U.S. Cl. ................................ 354/195.12; 354/150; 354/288
[58] Field of Search ................... 354/150, 195.12, 202, 354/288

[56] References Cited

U.S. PATENT DOCUMENTS

| | | | |
|---|---|---|---|
| 4,012,754 | 3/1977 | Waaske | 354/202 |
| 4,038,671 | 7/1977 | Schroder et al. | 354/195.12 |
| 4,171,894 | 10/1979 | Yamada | 354/288 |
| 4,352,546 | 10/1982 | Iwata et al. | 354/195.12 |
| 4,367,028 | 1/1983 | Tomatsuri et al. | 354/288 |
| 4,527,874 | 7/1985 | Ohmura | 354/195.12 |
| 4,564,278 | 1/1986 | Ohmura | 354/195.12 |

Primary Examiner—A. A. Mathews
Attorney, Agent, or Firm—Young & Thompson

[57] ABSTRACT

A camera of the type having interchangeable taking lenses with different focal lengths includes a lens cover with an opening formed therein for allowing light rays to enter a selected taking lens, and an optical path establishing member which can pivotally move in order to establish an optical path for either one of the interchangeable taking lenses, thereby to permit the choice of a taking lens suitable for an object to be photographed. The lens cover is manually moved in order to align the opening with either one of the interchangeable taking lenses or to cover and protect them; and this movement operates the optical path establishing member so as to cause it to establish the proper optical path for the taking lens with which the opening of the lens cover is aligned.

12 Claims, 4 Drawing Figures

CAMERA WITH INTERCHANGEABLE TAKING LENSES

BACKGROUND OF THE INVENTION

The present invention relates to cameras of the type having interchangeable taking lenses with different focal lengths either of which can be selectively used in accordance with the object to be photographed.

There are known in the art compact cameras of the type having interchangeable taking lenses with different focal lengths that allow photographers the flexibility of choosing a taking lens suitable for the object to be photographed. Such interchangeable taking lenses, for example a standard lens and a wide angle lens or a telephoto lens, have complete optical lens systems independently arranged in the camera. Such an independent arrangement can facilitate the choice of a taking lens suitable for the object to be photographed. Moreover, it has been usual to incorporate such taking lenses into the camera fixedly so as to avoid misalignment of the optical axes, which often arises in cameras having a plurality of taking lenses arranged in a turret head. On the other hand, because the respective taking lenses have different focal lengths, it is essential for cameras of this type to provide optical paths of different lengths.

Compact cameras recently placed on the market are provided with a lens cover for protecting the taking lens from dust, scratch marks and the like when the camera is not in use. The lens cover is movably incorporated into the camera so as to open and close a light entry opening provided in front of the lens.

If it is attempted to provide compact cameras of the type having interchangeable taking lenses of different focal lengths with a lens cover for each taking lens, not only does such an arrangement unavoidably require an intricate structure, but also it is rather tedious to manipulate a lens cover to open and close every taking lens.

Moreover, upon each choice of a suitable taking lens, an optical path peculiar to the chosen taking lens should be established in the camera. When the lens covers are unconnected to the rest of the camera structure, the photographer is required to perform the preparatory operations of opening the lens cover, choosing a taking lens, and establishing the optical path peculiar to the chosen taking lens, in this order, in advance of actuating the shutter. Such preparatory operations make compact cameras complicated to operate.

OBJECTS OF THE INVENTION

It is therefore an object of the present invention to provide an improved camera having interchangeable taking lenses with different focal lengths that can facilitate these preparatory operations.

Another object of the present invention is to provide an improved camera having interchangeable taking lenses with different focal lengths that is simple in structure and can be manufactured with ease.

SUMMARY OF THE INVENTION

To accomplish the above objects, the camera in accordance with the present invention includes interchangeable taking lenses with different focal lengths which have respective complete optical lens systems associated therewith, and a lens cover provided with an opening for allowing light rays to enter. The lens cover can be manually moved in order to align its opening with either of the interchangeable taking lenses, so as to choose a taking lens suitable for the object to be photographed. The camera also includes means such as a mirror pivotally movable in cooperation with the movement of the lens cover in order to establish an optical path peculiar to a taking lens chosen by manually operating the lens cover.

In one illustrated embodiment, a camera has a disc-like lens cover provided with an opening therein which can be manually rotated for a half turn rotation in order to align the opening with either one of two interchangeable taking lenses, such as a wide angle lens and a telephoto lens, arranged side by side in the camera, that is, to choose a taking lens suitable for the object to be photographed. This half-turn rotation effects the pivotal movement of a mirror through a link mechanism therebetween so as to establish an optical path between a film and a taking lens thus chosen.

In another illustrated embodiment, a camera has a generally rectangular lens cover with an opening which is slidably mounted on the front housing. The lens cover can be manually moved in order to align the opening with either one of two interchangeable taking lenses, thereby to choose a taking lens suitable for the object to be photographed. The sliding movement of the lens cover causes the pivotal movement of a mirror so as to establish an optical path between a film and a taking lens being chosen.

In accordance with the present invention, the provision of the lens cover with an opening whose operation is followed by the pivotal movement of a mirror for establishing an optical path, facilitates the preparatory operations required for the camera.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 1:
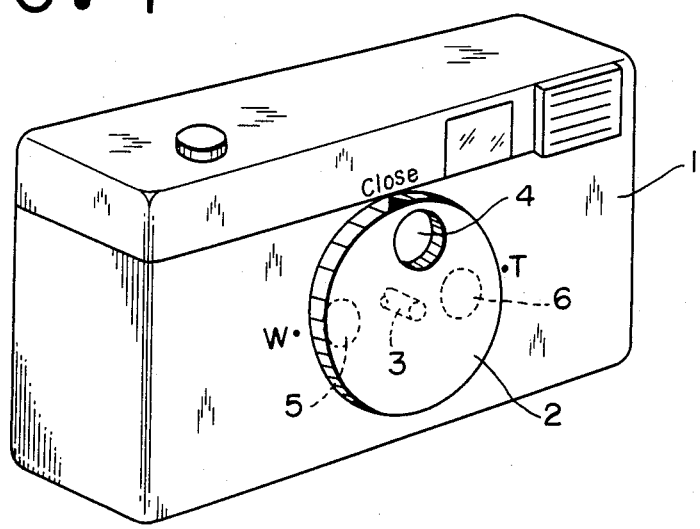
FIG. 1 is a perspective view of a camera in accordance with an embodiment of the present invention.

Referring now to FIG. 1, there is shown therein a camera according to the present invention having a body 1 on the front of which a disc-like lens cover 2 provided with an opening 4 is rotatably mounted on a pivot 3. The lens cover 2, which is usually maintained in a neutral position or closed position for covering and protecting the interchangeable taking lenses, namely a wide angle lens 5 and a telephoto lens 6 arranged side by side within the camera, can be manually rotated through 90° in either direction in order to align the opening 4 selectively with either of the interchangeable taking lenses so as to choose a taking lens suitable for the object to be photographed.

Figure 3:
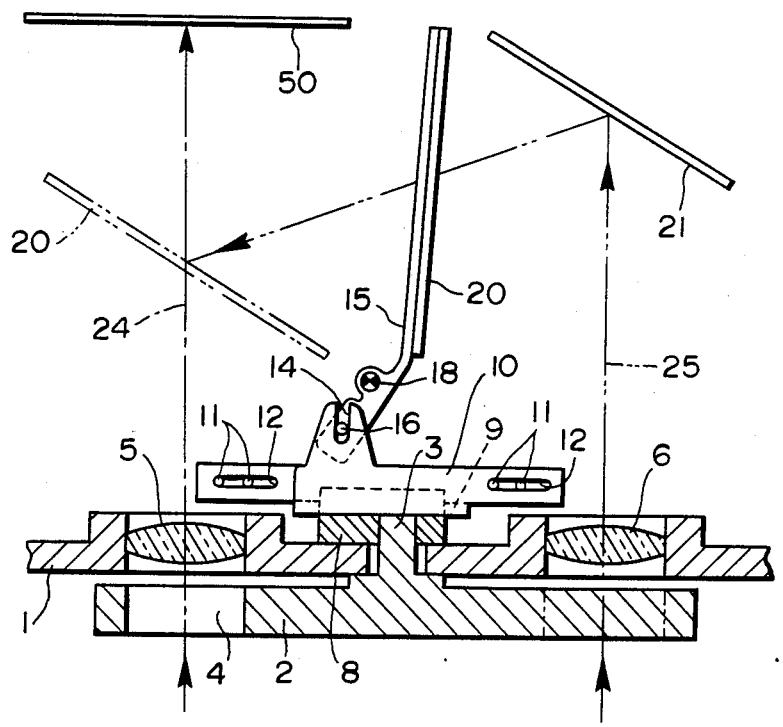
FIG. 3 is a cross sectional view showing a mechanism for choosing a taking lens from among two interchangeable taking lenses.
Figure 2:
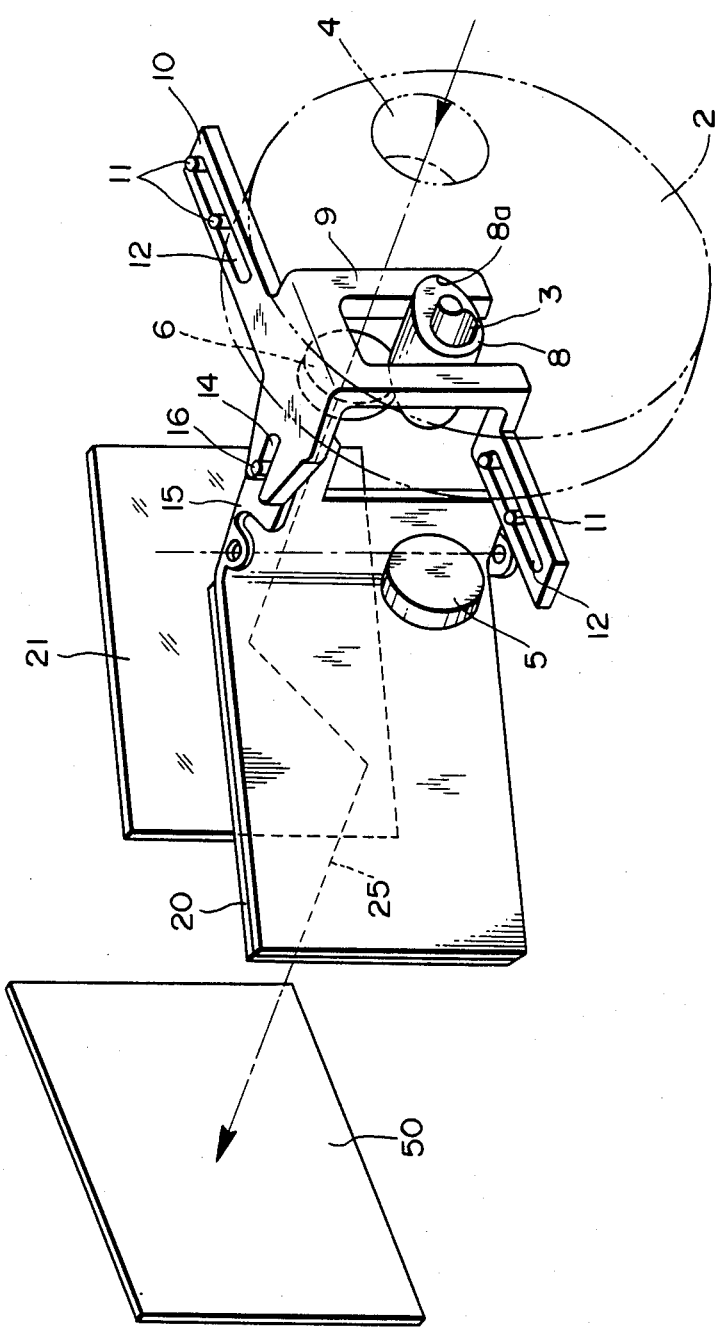
FIG. 2 is a perspective view showing the major components of a camera in accordance with an embodiment of the present invention.

Referring to FIGS. 2 and 3, reference numeral 20 designates a mirror which can be swung in order to establish an optical path suitable to a chosen taking lens. For this purpose, a link mechanism is provided between the lens cover 2 and the mirror 20. This link mechanism includes a trifurcated plate 10, which is slidably mounted on the camera by means of pins 11 and slots 12 for movement in a direction perpendicular to optical axes 24, 25 of the lenses 5, 6, respectively. The trifurcated plate 10 has a downwardly extending forked arm 9 which holds between the forks a cam 8 fixed to the shaft 3. It should be noted that the cam 8 is so arranged as to align its enlarged cam position 8a with the opening 4.

The trifurcated plate 10 also has an arm that extends parallel to the optical axes 24, 25 and is provided with a slot 14 which is engaged by a pin 16 mounted on a mirror-supporting frame 15 pivotally mounted on a pivot 18. Consequently, a half turn of the lens cover 2 is followed by the sliding movement of the trifurcated plate 10 which causes the pivotal movement of the mirror 20. When the mirror 20 is in the position shown by the solid line in FIG. 3 or has escaped from the position shown by the double dotted line, an optical path 24 is established for the wide angle lens 5, so that image-forming light rays pass along the straight optical axis and impinge upon a film 50 disposed within the camera. On the other hand, when the mirror 20 is in the position shown by the double dotted line in FIG. 3, it blocks the optical path 24 and simultaneously establishes an optical path 25 with sharp turns for the telephoto lens 6. Thus, a light ray travelling along the optical axis of the telephoto lens 6 is at first reflected by a mirror 21 fixedly mounted within the camera toward the mirror 20 and then reflected by mirror 20 so as to impinge upon the film 50.

In the embodiment described above, when the wide angle 5 is chosen, the lens cover 2 is manually rotated through 90° in the counterclockwise direction from the closed position so as to align the opening 4 with the wide angle lens 5. As a result of the rotation of the lens cover, the cam 8 is also rotated through the same angle in the same direction, bringing the enlarged cam portion 8a into the position shown in FIG. 3. The rotation of the cam 8 causes the trifurcated plate 10 to slide to the left with being followed by the clockwise rotation of the mirror supporting frame 15 about the pivot 18. Consequently, the mirror 20 moves to the position shown in FIG. 3 so as to unblock the straight optical path 24 for the wide angle lens 5, allowing wide angle photography.

For telephotography, the telephoto lens 6 must be chosen. Selection is performed by manually rotating the lens cover 2 through 90° in the clockwise direction so as to align the opening 4 with the telephoto lens 6. As mentioned previously, the clockwise rotation of the lens cover 2 causes the trifurcated plate to slide to the right so as to bring the mirror 20 into the position shown in FIG. 2 wherein the mirror 20 blocks the optical path 24 of the wide angle lens 5. In this position, the mirror 20, which is now parallel to the fixed mirror 21, increases the length of the optical path 25 between the telephoto lens 6 and the film 50. In this way, the preparatory operations required both for wide angle photography and for telephotography can be effected by rotating the lens cover through a quarter turn in either direction.

Figure 4:
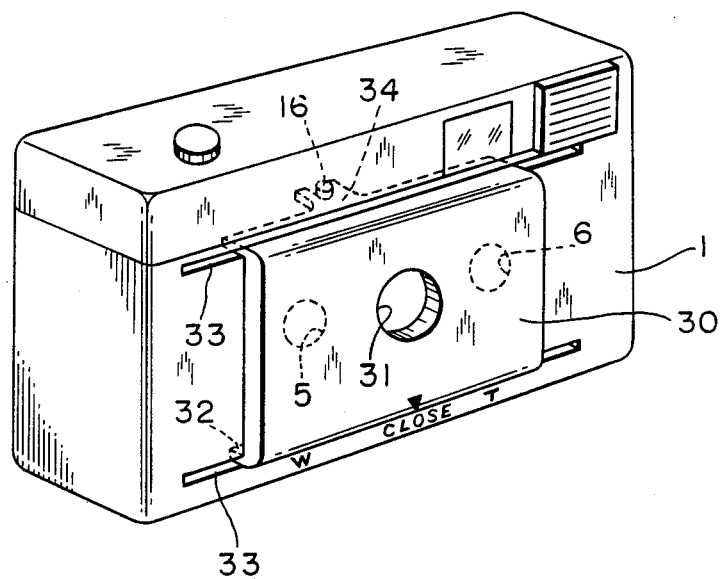
FIG. 4 is a perspective view showing a camera in accordance with another embodiment of the present invention.

Referring to FIG. 4, there is shown therein a camera in accordance with another embodiment of the present invention having a generally rectangular lens cover 30 which can be manually moved for reciprocatory rectilinear displacement in order to choose a taking lens suitable for the object to be photographed. For this parallel displacement, the lens cover 30 has upper and lower projecting rims 32 which can slide in parallel guide slots 33 formed in the front body 1 of the camera. The lens cover 30, which is also provided with an opening 31 for allowing light rays to pass therethrough, is moved to the left or the right in order to align the opening 31 with either one of the interchangeable taking lenses thereby to choose the wide angle lens 5 or the telephoto lens 6.

In this embodiment, the link mechanism between the lens cover 30 and the mirror 20 (shown in FIGS. 2 and 3) is simplified by replacing the trifuracted plate 10 and the cam 8 of the above-described embodiment with a projection 34 with a slot which extends rearward of the upper flange 32 of cover 30. The upper and lower flanges 32 of cover 30 are slidable in slots 33, thereby to permit selective alignment of opening 31 with either of lenses 5 and 6. Owing to the engagement between the slot of the projection 34 and the pin 16 mounted on the mirror supporting frame 15, the rectilinear movement of the lens cover 30 causes the swing motion of the mirror 20 for establishing an optical path in the same way as in FIGS. 1 to 3.

The invention has been described in detail with particular reference to preferred embodiments thereof, but it will be understood by those skilled in the art that variations and modifications can be effected with the spirit and scope of the invention. For example, various combinations of taking lenses, such as a standard lens and a wide angle lens or telephoto lens may be provided in place of the combination of a wide angle lens and a telephoto lens.

What is claimed is:

1. A camera having interchangeable taking lenses with different focal lengths, comprising
    cover means having an opening therethrough;
    means mounting the cover means on the camera for selective movement between positions in which said opening is aligned with a selected one of said taking lenses;
    means in the camera movable between two positions in each of which there is established an optical path of suitable length from a respective one of said taking lenses; and
    means interconnecting said cover means and said movable means such that when said cover means is moved so that said opening is in alignment with one of said taking lenses, said movable means is moved to the said position in which the optical path of said one lens is established, and when said cover means is moved so that said opening is in alignment with the other said taking lens, said movable means is moved to the said position in which the optical path of the other said taking lens is established.

2. A camera as claimed in claim 1, in which said cover means is movable to a position in which said opening is out of alignment with both of said taking lenses in which said cover means closes both of said taking lenses.

3. A camera as claimed in claim 1, in which said cover means is of disc-like shape and is rotatably mounted on said camera body.

4. A camera as claimed in claim 1, in which said cover means is parallelepipedal and is slidably mounted for rectilinear movement on said camera body.

5. A camera as claimed in claim 1, in which said movable means is a mirror pivotally mounted in the camera.

6. A camera as claimed in claim 1, in which said lenses are a wide angle lens and a telephoto lens having parallel optical axes.

7. A camera as claimed in claim 1, in which said cover means has two end positions of movement in each of which said opening is in alignment with a said taking lens.

8. A camera as claimed in claim 1, in which the axis of one of said lenses passes through a film within the camera, the distance between this last-mentioned lens and the film being the focal length of said last-mentioned lens.

9. A camera as claimed in claim 8, having a fixed mirror on the optical axis of the other said taking lens, said movable means comprising another mirror swingable into and out of the optical axis of the lens whose optical axis passes through the film, said swingable mirror reflecting an image from said other lens from said fixed mirror to said film when disposed in the optical path of the lens whose optical axis passes through the film.

10. A camera as claimed in claim 1, in which said lens cover is rotatably mounted on the front of the camera body, a cam secured to the lens cover, a slidable member that is caused to slide along a rectilinear path perpendicular to the axes of said lenses upon rotation of said cam, and pin and slot means between said slidable member and said movable means to actuate said movable means upon rotation of said lens cover.

11. A camera as claimed in claim 1, in which said lens cover is slidable rectilinearly on said camera and has a projection extending within the camera and engaging said movable means.

12. A camera as claimed in claim 11, in which said member and said movable means are interconnected for relative movement by a pin on said movable means that rides in a slot in said projection.

* * * * *